United States Patent
Shibata et al.

(10) Patent No.: US 11,090,978 B2
(45) Date of Patent: Aug. 17, 2021

(54) TUNGSTEN WIRE AND ELASTIC COMPONENT

(71) Applicant: Panasonic Intellectual Property Management Co., Ltd., Osaka (JP)

(72) Inventors: Tetsuji Shibata, Osaka (JP); Tomoya Iwahashi, Osaka (JP); Tomohiro Kanazawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/549,048

(22) Filed: Aug. 23, 2019

(65) Prior Publication Data

US 2020/0070583 A1 Mar. 5, 2020

(30) Foreign Application Priority Data

Aug. 31, 2018 (JP) .............................. JP2018-163477

(51) Int. Cl.
*B32B 15/06* (2006.01)
*B60C 9/00* (2006.01)
*C22C 27/04* (2006.01)

(52) U.S. Cl.
CPC ............ *B60C 9/0007* (2013.01); *C22C 27/04* (2013.01)

(58) Field of Classification Search
None
See application file for complete search history.

(56) References Cited

U.S. PATENT DOCUMENTS

| | | | |
|---|---|---|---|
| 3,661,536 A * | 5/1972 | Shimizu | C22C 27/04 75/248 |
| 5,298,539 A * | 3/1994 | Singh | C08K 5/34922 524/92 |
| 6,997,224 B2 * | 2/2006 | Herbelleau | B60C 9/023 152/539 |
| 2003/0034170 A1 * | 2/2003 | Sugimaru | C23C 2/38 174/126.2 |
| 2005/0274443 A1 * | 12/2005 | Monnerie | B60C 9/023 152/531 |
| 2009/0025846 A1 | 1/2009 | Miyazaki et al. | |
| 2016/0130750 A1 | 5/2016 | Song et al. | |
| 2018/0326519 A1 * | 11/2018 | Kanazawa | B21C 9/00 |

FOREIGN PATENT DOCUMENTS

| | | |
|---|---|---|
| CN | 101326324 A | 12/2008 |
| CN | 105586795 A | 5/2016 |
| CN | 107538948 A | 1/2018 |

(Continued)

OTHER PUBLICATIONS

FF Schmidt and HR Ogden, "The engineering properties of tungsten and tungsten alloys", Sep. 27, 1963, DMIC Report 191, p. A-9 (Year: 1963).*

(Continued)

*Primary Examiner* — Seth Dumbris
*Assistant Examiner* — Kim S. Horger
(74) *Attorney, Agent, or Firm* — Renner, Otto, Boisselle & Sklar, LLP

(57) ABSTRACT

A tungsten wire according one aspect of the present disclosure includes: a metal wire containing one of tungsten and a tungsten alloy; and a plating layer which covers a surface of the metal wire. The plating layer contains copper.

10 Claims, 4 Drawing Sheets

(56) References Cited

FOREIGN PATENT DOCUMENTS

| JP | 2002173731 | A | * | 6/2002 |
|----|------------|---|---|--------|
| JP | 2007031890 |   |   | 2/2007 |
| JP | 2013081982 | A | * | 5/2013 |
| JP | 2013094801 | A | * | 5/2013 |

OTHER PUBLICATIONS

Takaaki Minamida, et al., "Developments in Steel Cord Wire Rods", Kobe Steel Engineering Reports, vol. 50, No. 3, Dec. 2000, pp. 31-35 with its partial English translation.
Taiwanese Office Action and Search Report for corresponding TW Patent Application No. 108129731 dated May 3, 2021, with English translation of Search Report.

* cited by examiner

DIE
EXCHANGE

TUNGSTEN WIRE AND ELASTIC COMPONENT

CROSS REFERENCE TO RELATED APPLICATION

This application claims the benefit of priority of Japanese Patent Application Number 2018-163477 filed on Aug. 31, 2018, the entire content of which is hereby incorporated by reference.

BACKGROUND

1. Technical Field

The present disclosure relates to a tungsten wire and an elastic component.

2. Description of the Related Art

Conventionally, tires include steel cords as reinforcement members (see, for example, Japanese Unexamined Patent Application Publication No. 2007-31890).

SUMMARY

However, the above-described conventional steel cords have a high elongation due to the material physical property, and thus it is not possible to inhibit deformation in a tire when a heavy load is applied to the tire.

In view of the above, the present disclosure provides a tungsten wire capable of inhibiting deformation in a rubber material when the tungsten wire is used to reinforce the rubber material, and an elastic component in which deformation is inhibited.

In view of the above, a tungsten wire according to an aspect of the present disclosure includes a metal wire containing one of tungsten and a tungsten alloy; and a plating layer which covers a surface of the metal wire. the tungsten wire, the plating layer contains copper.

With the tungsten wire according to the present disclosure, it is possible to inhibit deformation in a rubber material when the tungsten wire is used to reinforce the rubber material.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 5C1 is a diagram which illustrates a process of the manufacturing method of the metal wire according to the embodiment;

FIG. 5C2 is a diagram which illustrates a process of the manufacturing method of the metal wire according to the embodiment;

FIG. 5C3 is a diagram which illustrates a process of the manufacturing method of the metal wire according to the embodiment;

FIG. 5C4 is a diagram which illustrates a process of the manufacturing method of the metal wire according to the embodiment;

DETAILED DESCRIPTION OF THE EMBODIMENT

The following describes in detail a tungsten wire and an elastic component according to an embodiment of the present disclosure, with reference to the drawings. It should be noted that the embodiment described below indicates one specific example of the present disclosure. The numerical values, shapes, materials, structural components, the disposition and connection of the structural components, etc. described in the following embodiment are mere examples, and do not intend to limit the present disclosure. Furthermore, among the structural components in the following embodiment, components not recited in the independent claims each of which indicates the broadest concept of the present disclosure are described as arbitrary structural components.

In addition, each diagram is a schematic diagram and not necessarily strictly illustrated. Accordingly, for example, scale sizes, etc. are not necessarily exactly represented. In each of the diagrams, substantially the same structural components are assigned with the same reference signs, and redundant descriptions will be omitted or simplified.

In addition, a term representing a relationship between the components as well as a term, such as "circular", representing a form, and a numerical range are used in the present description. Such terms and range are each not representing only a strict meaning of the term or range, but implying that a substantially same range, e.g., a range that includes even a difference as small as few percentages, is connoted in the term or range.

(Embodiment)

First, an elastic component in which a tungsten wire according to an embodiment is employed will be described. In the following description, a tire of a vehicle will be described as one example of the elastic component.

[Configuration of Tire]

Figure 1:
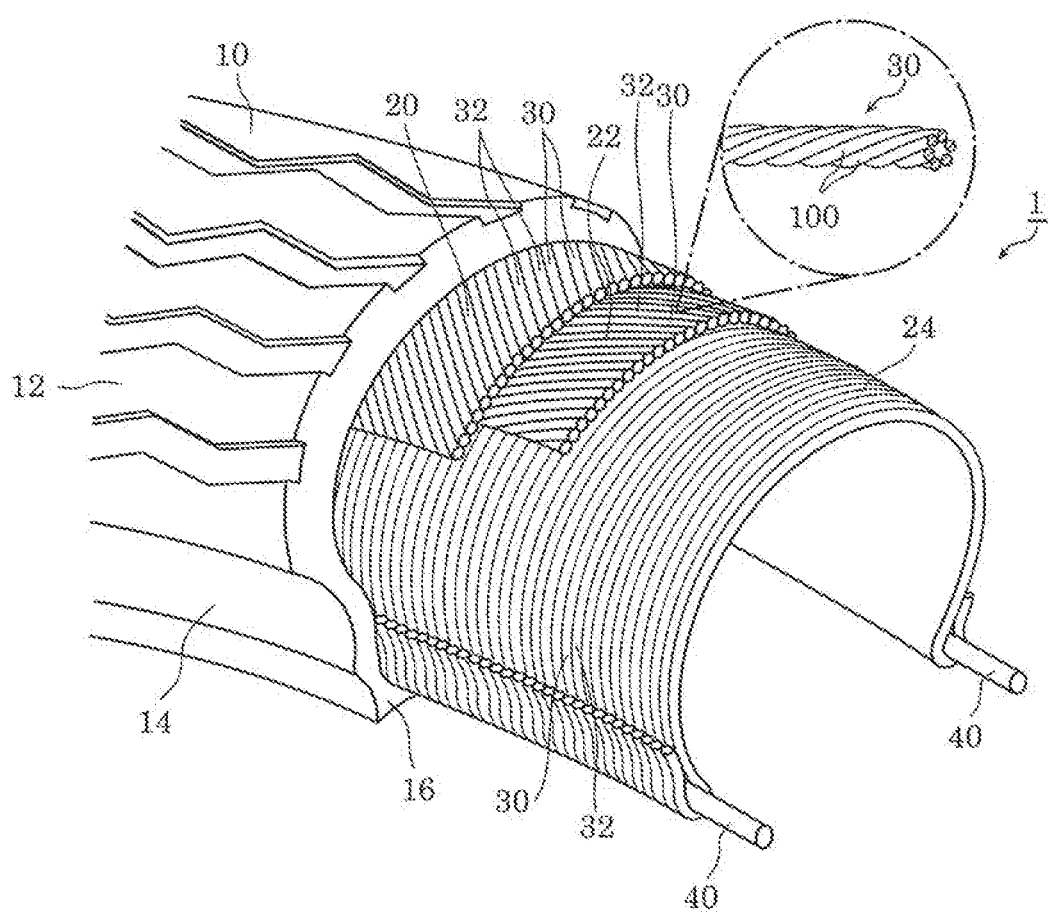
FIG. 1 is a partially cutaway cross-sectional view which illustrates a configuration of a tire according to an embodiment.

FIG. 1 is a partially cutaway cross-sectional view which illustrates a configuration of tire 1 according to the embodiment. Tire 1 illustrated in FIG. 1 is one example of an elastic component including tungsten wire 100 and rubber material 10. Tire 1 is a pneumatic radial tire. Tire 1 is, for example, a tire of a vehicle such as a four-wheeled vehicle and a two-wheeled vehicle. As illustrated in FIG. 1, tire 1 includes rubber material 10, belts 20 and 22, carcass ply 24, and bead 40.

Rubber material 10 is a component forming an outer shell of tire 1. As illustrated in FIG. 1, rubber material 10 includes tread 12 which corresponds to a portion that makes contact with the ground, a pair of sidewalls 14 which extend in a radial direction toward the center of tire 1 from both ends of tread 12, and bead unit 16 disposed at the end of each of the pair of sidewalls 14.

Belts 20 and 22, carcass ply 24, and bead 40 are embedded inside rubber material 10. In other words, rubber material 10 covers each of belts 20 and 22, carcass ply 24, and bead 40.

The rubber material may be any suitable rubber material. In some embodiments, rubber material 10 contains, as a main component, natural rubber, styrene-butadiene rubber, butadiene rubber, isoprene rubber, butyl rubber, or the like. Rubber material 10 may contain, for example, sulfur (S) and carbon (C). More specifically, rubber material 10 may contain carbon black. This may increase the strength of rubber material 10.

Belts 20 and 22 are embedded inside tread 12 of rubber material 10, and disposed outside carcass ply 24. Belts 20 and 22 each include a plurality of reinforcement cords 30, 32 which are inclined (at an angle) relative to a circumferential direction of tire 1. Reinforcement cords 30, 32 of belt 20 and reinforcement cords 30, 32 of belt 22 diagonally cross one another. In some embodiments, the reinforcement cords of a belt are at an angle relative to the circumferential direction of tire 1 in a range from at least 15 degrees to at most degrees, for example. In some embodiments, the pick density of the reinforcement cords in a belt is in a range from at least 10 cords/50 mm to at most 30 cords/50 mm.

Carcass ply 24 toroidally extends over a pair of beads 40. Carcass ply 24 has ends which are turned up from the inside to the outside of tire 1 around the respective beads 40. Carcass ply 24 also includes a plurality of reinforcement cords 30, 32 extending in the radial direction of tire 1.

The reinforcement cords included by belts 20 and 22 and carcass ply 24 are a plurality of tungsten cords 30 and a plurality of steel cords 32. In some embodiment, for each of belt 20, belt 22, and carcass ply 24, the number of tungsten cords 30 may be the same as the number of steel cords 32, for example (although the respective total number of cords for each of belt 20, belt 22, and carcass ply 24 may be the same or different from one another). Accordingly, the total number of tungsten cords 30 may be the same as the total number of steel cords 32, for example. Tungsten cords 30 and steel cords 32 are alternately arranged side by side. Alternatively, one or more of belt 20, belt 22, and carcass ply 24 may have a different number of tungsten cords 30 than the number of steel cords 32. For example, one or more of belt 20, belt 22, and carcass ply 24 may have a greater number of tungsten cords 30 than steel cords 32. In another example, one or more of belt 20, belt 22, and carcass ply 24 may have a greater number of steel cords 32 than tungsten cords 30. Accordingly, in some embodiments, the total number of steel cords 32 may be greater than the total number of tungsten cords 30, or may be less than the total number of tungsten cords 30. Tungsten cords 30 may be randomly arranged among the plurality of steel cords 32.

Each of tungsten cords 30 is a twisted wire of a plurality of tungsten wires 100, as illustrated in FIG. 1. Tungsten cord 30 is, for example, a piled yarn formed using six tungsten wires 100. It should be noted that tungsten cord 30 may be a covered yarn. Alternatively, the total number of tungsten wires 100 included in tungsten cord 30 may be other than six, and is not specifically limited. For example, tungsten cord 30 may be other than the twisted wire, and may be quite simply a single tungsten wire 100.

Each of steel cords 32 has the same configuration as tungsten cord 30 except for that piano wires are used instead of tungsten wires 100. The piano wires are metal wires formed using carbon steel. It should be noted that a reinforcement cord formed using a polymeric material such as nylon, polyester, and aramid fiber may be used, instead of steel cord 32, for at least one of belts 20 and 22 and carcass ply 24. Furthermore, at least one of belts 20 and 22 and carcass ply 24 may include only tungsten cord 30 without steel cord 32. Furthermore, at least one of belts 20 and 22 and carcass ply 24 may be implemented without including tungsten cord 30.

[Configuration of Tungsten Wire]

Figure 2:
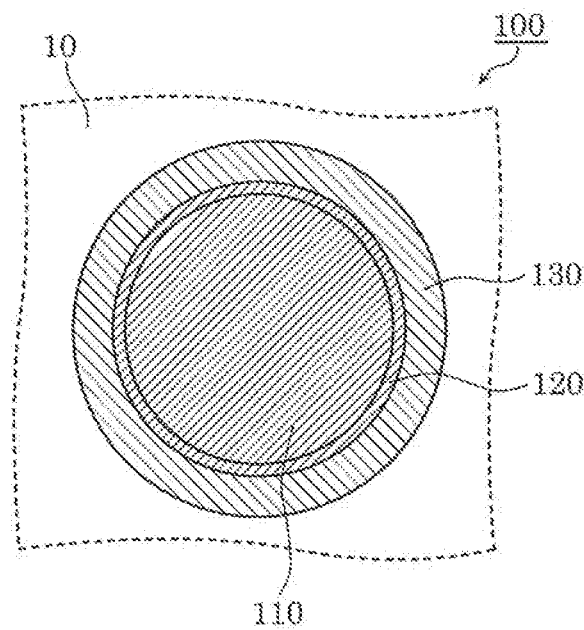
FIG. 2 is a cross-sectional view of a tungsten wire in rubber material according to the embodiment.

FIG. 2 is a cross-sectional view of tungsten wire 100 according to the embodiment. More specifically, FIG. 2 illustrates a cross-section surface of one of tungsten wires 100 included in tungsten cord 30, cut along a surface perpendicular to an axial direction of the cord.

As illustrated in FIG. 2, tungsten wire 100 includes metal wire 110, strike plating layer 120, and plating layer 130. Tungsten wire 100 is embedded in rubber material 10. More specifically, in tungsten wire 100, a surface of plating layer 130 is covered by rubber material 10.

Metal wire 110 contains one of tungsten (W) and a tungsten alloy. A tungsten content of metal wire 110 is, for example, at least 90 wt %. For example, the tungsten content may be at least 95 wt %, at least 99 wt %, or at least 99.9 wt %. It should be noted that the content of a metal element (e.g., tungsten) included in metal wire 110 is a ratio of the metal element with respect to a total weight of metal wire 110. According to the embodiment, metal wire 110 is, for example, a pure tungsten wire whose content (the degree of purity) is at least 99.9 wt %.

Alternatively, metal wire 110 may be a metal wire containing an alloy including tungsten and rhenium (Re), namely, a ReW alloy. The rhenium content of a ReW alloy wire is, for example, at least 0.1 wt % and at most 10 wt %. For example, the rhenium content may be at least 0.5 wt % and at most 5 wt %. Although the rhenium content is 3 wt % as one example, it may be 1 wt %.

Alternatively, metal wire 110 may be a metal wire containing tungsten doped with potassium. A potassium content of a potassium-doped tungsten wire is at least 0.001 wt % and at most 0.010 wt %. For example, the potassium content may be greater than or equal to 0.005 wt %.

A tensile strength of the ReW alloy wire or the potassium-doped tungsten wire increases with an increase in the rhenium or potassium content. However, when the rhenium or potassium content is excessively high, it is difficult to render the ReW alloy wire or the potassium-doped tungsten wire thinner.

Metal wire 110 containing one of tungsten and the tungsten alloy has a tensile strength that increases with a decrease in a diameter. More specifically, it is possible to inhibit deformation of rubber material 10, by using metal wire 110 containing one of tungsten and the tungsten alloy as a reinforcement member of rubber material 10.

Specifically, the tensile strength of metal wire 110 is greater than or equal to 4000 MPa. For example, the tensile strength of metal wire 110 may be greater than or equal to 4500 MPa, or may be greater than or equal to 5000 MPa.

In addition, an elastic modulus of metal wire 110 is at least 350 GPa and at most 450 GPa. It should be noted that the elastic modulus is a longitudinal elastic modulus. In addition, an elastic modulus of piano wire is generally in a range of from 150 GPa to 250 GPa. In other words, metal wire 110 has an elastic modulus approximately twice as great as that of piano wire.

As having an elastic modulus greater than or equal to 350 GPa, metal wire 110 is resistant to deformation. Stated differently, metal wire 110 is less likely to elongate. Accordingly, deformation in tungsten cord 30 including metal wire 110 is more inhibited than steel cord 32 including piano wire, and thus deformation in rubber material 10 is inhibited. Meanwhile, as having an elastic modulus less than or equal to 450 GPa, it is possible to transform metal wire 110 to a certain degree. More specifically, since metal wire 110 can be bent, it is possible to easily form tungsten cord 30 including metal wire 110 into a shape suitable to tire 1.

The diameter of metal wire 110 is at least 50 μm and at most 200 μm. For example, the diameter of metal wire 110 may be less than 50 μm, less than or equal to 40 μm, or less than or equal to 30 μm. Specifically, the diameter of metal wire 110 is 80 μm. However, the diameter of metal wire 110 is not limited to this example. The diameter of metal wire 110 is uniform in the axial direction at any portions in metal wire 110. However, the diameter of metal wire 110 need not necessarily be completely uniform, and may differ at different portions by a certain percentage such as 1%.

Metal wire 110 is, for example, a metal wire which has a substantially circular shape in the cross-section orthogonal to the axis of metal wire 110, but not limited to this example. The cross-section shape of metal wire 110 may be quadrilateral such as square, oval, hexagon, octagon, pentagon, or the like.

Figure 3:
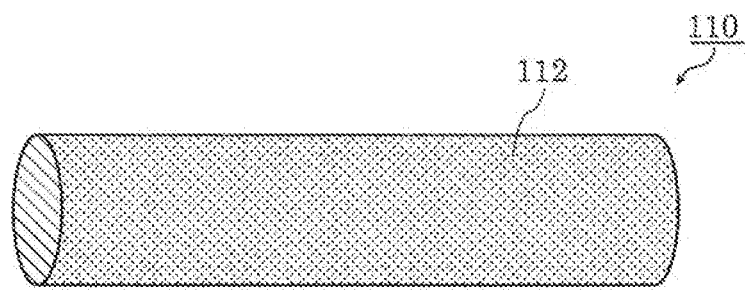
FIG. 3 is a perspective view which illustrates one example of a surface state of a metal wire according to the embodiment.

According to the embodiment, a surface (outer peripheral surface) of metal wire 110 includes unevenness. FIG. 3 is a perspective diagram which illustrates one example of a surface state of metal wire 110 according to the embodiment. As illustrated in FIG. 3, metal wire 110 includes fine unevenness 112 provided on the surface. Fine unevenness 112 is provided to the entirety of the outer peripheral surface of metal wire 110. The surface of metal wire 110 illustrated in FIG. 3 has surface roughness Ra of at least 0.1 μm and at most 10 μm, for example. Surface roughness Ra of the surface of metal wire 110 may be at least 3 μm and at most 4 μm.

Fine unevenness 112 includes a plurality of recesses having different shapes and a plurality of protrusions having different shapes. The shapes, sizes, and dispositions of the recesses and the protrusions are random. At least one face included in the recesses and protrusions may be a flat surface, or a curved surface such as a concave surface or a convex surface. Alternatively, fine unevenness 112 may include a plurality of recesses and a plurality of protrusions which are regular in at least one of shape, size, and disposition.

Figure 4:
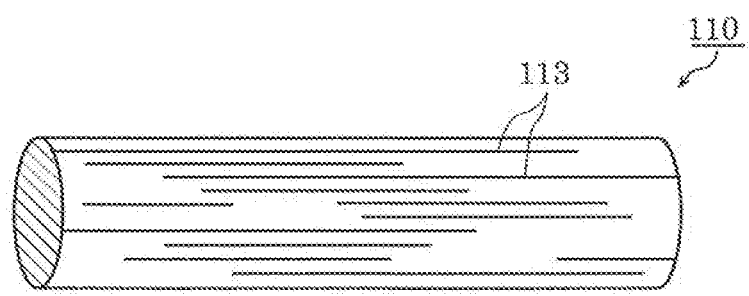
FIG. 4 is a perspective view which illustrates another example of the surface state of the metal wire according to the embodiment.

FIG. 4 is a perspective diagram which illustrates another example of the surface state of metal wire 110 according to the embodiment. As illustrated in FIG. 4, metal wire 110 may include a plurality of grooves 113 provided on the surface. The plurality of grooves 113 are each provided along an axial direction of metal wire 110. The plurality of grooves 113 may be random or uniform in length. Unevenness is provided on the surface of metal wire 110, by forming the plurality of grooves 113. The surface of metal wire 110 illustrated in FIG. 4 has surface roughness Ra of at least 0.1 μm and at most 10 μm, for example. Surface roughness Ra may be at least 3 μm and at most 4 μm.

As illustrated in FIG. 2, strike plating layer 120 is disposed between metal wire 110 and plating layer 1.30, and is in contact with and covers the surface of metal wire 110. More specifically, strike plating layer 120 is in contact with the outer peripheral surface of metal wire 110. Strike plating layer 120 may be in contact with the entirety of the outer peripheral surface of metal wire 110.

Strike plating layer 120 is, for example, a nickel plating layer which contains nickel (Ni). Strike plating layer 120 has a thickness that is uniform over the entire circumference of metal wire 110. However, the thickness of strike plating layer 120 need not necessarily be completely uniform, and may differ at different portions by a certain percentage such as 1%. For example, the thickness of strike plating layer 120 is 1 μm, but is not limited to this example.

It should be noted that, when the surface of metal wire 110 includes unevenness as illustrated in FIG. 3 (fine unevenness 112) and FIG. 4 (grooves 113), strike plating layer 120 is formed to have a shape following the shape of the unevenness. In other words, the surface of strike plating layer 120 also includes unevenness.

Plating layer 130 is a plating layer that covers the surface of metal wire 110. More specifically, plating layer 130 is in contact with and covers the surface of strike plating layer 120. The surface of plating layer 130 is in contact with rubber material 10. Plating layer 130 is provided so as to increase the adhesion between metal wire 110 and rubber material 10.

Plating layer 130 is a plating layer which contains copper. More specifically, plating layer 130 is a brass plating layer. Alternatively, plating layer 130 may be a copper plating layer containing copper alone, or an alloy plating layer which includes an alloy containing copper. Plating layer 130 has a thickness that is uniform over the entire circumference of metal wire 110. However, the thickness of plating layer 130 need not necessarily be completely uniform, and may differ at different portions by a certain percentage such as 1%. For example, the thickness of plating layer 130 is 5 μm, but is not limited to this example.

In addition, when the surface of metal wire 110 includes unevenness as illustrated in FIG. 3 (fine unevenness 1.12) and FIG. 4 (grooves 113), plating layer 130 is formed to have a shape following the shape of the unevenness. In other words, the surface of plating layer 130 also includes unevenness. The area of contact between plating layer 130 and rubber material 10 increases as a result of providing unevenness on the surface of plating layer 130. In this manner, it is possible to increase adhesion between plating layer 130 and rubber material 10.

[Manufacturing Method]

Next, a method of manufacturing tungsten wire 100 will be described. First, a method of manufacturing metal wire 110 will be described with reference to FIGS. 5A, 5B, 501 to 5C4, and 5D. FIGS. 5A, 5B, 5C1 to 5C4, and 5D illustrate the method of manufacturing metal wire 110 according to the embodiment.

Figure 5A:
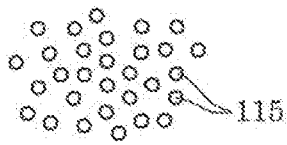
FIG. 5A is a diagram which illustrates a process of a manufacturing method of the metal wire according to the embodiment.

First, as illustrated in FIG. 5A, tungsten powders 115 are prepared. In the case where metal wire 110 is a ReW alloy wire, tungsten powders 115 and rhenium powders are prepared at a predetermined proportion. The same holds true for the case where metal wire 110 is a potassium-doped tungsten wire. An average grain diameter of tungsten powders 115 is, for example, 5 μm, but not limited to this example.

Figure 5B:
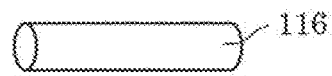
FIG. 5B is a diagram which illustrates a process of the manufacturing method of the metal wire according to the embodiment.
Figure 5B:
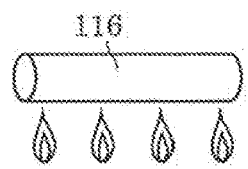
Figure 5B:
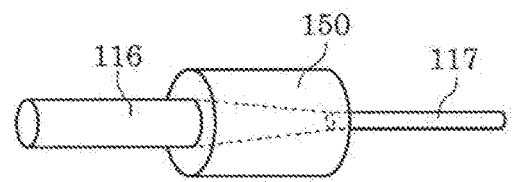
Figure 5B:
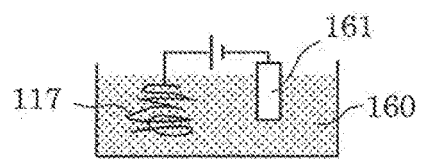
Figure 5B:
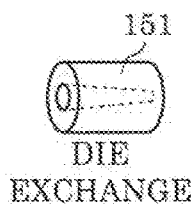

Next, by pressing and sintering an aggregation of tungsten powders 115, a tungsten ingot containing tungsten is produced. By performing, onto the tungsten ingot, swaging processing of extending an ingot by press-forging the ingot from its periphery, metal wire 116 having a wire shape is produced, as illustrated in FIG. 5B. For example, metal wire 116 having a wire shape has a diameter of approximately 3 mm whereas the tungsten ingot that is a sintered body has a diameter of approximately 15 mm.

Next, drawing processing using wire drawing dies is carried out, as illustrated in FIGS. 5C1 to C4.

Specifically, metal wire 116 is first annealed, as illustrated in FIG. 5C1. More specifically, metal wire 116 is heated not only directly with a burner, but also by being applied with electrical current therethrough. The annealing process is performed in order to eliminate processing distortion generated in the swaging or drawing processing.

Next, drawing of metal wire 116 using wire drawing die 150, namely, a wire drawing process, is performed, as illustrated in FIG. 5C2. It should be noted that, since metal wire 116 is rendered ductile after having been heated in the previous step of the annealing process, wire drawing can be easily carried out. As a result of metal wire 116 being rendered thinner, the tensile strength of metal wire 116 per an area of cross-section increases. In other words, metal wire 117 which has been rendered thinner in the wire drawing process has a tensile strength per an area of the cross-section greater than that of metal wire 116 before being rendered thinner. It should be noted that the diameter of metal wire 117 is 0.6 mm, for example, but not limited to this example.

Next, through the electrolytic polishing of metal wire 1.17 after the drawing process, the surface of metal wire 117 is rendered smooth, as illustrated in FIG. 5C3. The electrolytic polishing process is carried out by conducting electricity between metal wire 117 and counter electrode 161 such as a carbon rod, in the state in which metal wire 117 and counter electrode 161 are bathed into electrolyte 160, e.g., aqueous sodium hydroxide.

Next, die exchange is carried out, as illustrated in FIG. 5C4. More specifically, wire drawing die 151 with a pore diameter smaller than a pore diameter of wire drawing die 150 is selected as a die to be used in the next drawing processing. It should be noted that wire drawing dies 150 and 151 are, for example, diamond dies containing sintered diamond, single-crystal diamond, or the like.

The processes illustrated in FIG. 5C1 to FIG. 5C4 may be repeatedly carried out until the diameter of metal wire 117 is thinned down to a desired diameter φ (for example, 80 μm). At this time, the drawing process illustrated in FIG. 5C2 is performed by adjusting the form and hardness of wire drawing die 150 or 151, a lubricant to be used, and the temperature of a metal wire, in accordance with the diameter of the metal wire to be processed.

Similarly, in the annealing process illustrated in FIG. 5C1, annealing conditions are adjusted in accordance with the diameter of the metal wire to be processed. Through the annealing process, an oxidation product is fixed to the surface of the tungsten wire. It is possible to adjust the amount of oxidation products to be fixed to the surface of the tungsten wire, by adjusting the annealing conditions.

More specifically, the larger the diameter of the metal wire is, at a higher temperature the metal wire is annealed, and the smaller the diameter of the metal wire is, at a lower temperature the metal wire is annealed. In the case where the diameter of the metal wire is large, for example, the metal wire is annealed, specifically, at the temperature between 1400 degrees Celsius and 1800 degrees Celsius in the annealing process carried out in the first drawing processing. In the final annealing process carried out in the final drawing processing in which the metal wire is thinned down to finally have a desired diameter, the metal wire is heated at a temperature between 1200 degrees Celsius and 1500 degrees Celsius. It should be noted that, in the final annealing process, electricity need not necessarily be conducted to the metal wire.

Moreover, an annealing process may be omitted when the drawing processing is repeated. For example, the final annealing process may be omitted. More specifically, in order to decrease the crystal grain size, the final annealing process may be omitted and a lubricant as well as the form and hardness of a wire drawing die may be adjusted.

Figure 5D:
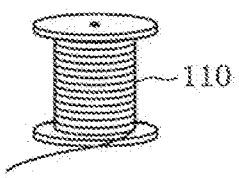
FIG. 5D is a diagram which illustrates a process of the manufacturing method of the metal wire according to the embodiment.

Through the processes as described above, metal wire 110 is manufactured as illustrated in FIG. 5D. The length of metal wire 110 is, for example, at least 50 km immediately after manufacturing. Metal wire 110 is cut to a suitable length according to the aspect in which metal wire 110 used.

It should be noted that FIGS. SA, 5B, 5C1 to 5C4, and 5D schematically illustrate the respective processes of the manufacturing method of metal wire 110. Each of the processes is performed, for example, as an in-line process. For example, a plurality of wire drawing dies may be aligned in a descending order of pore diameters in a production line, and heating devices for conducting an annealing process, electrolytic polishing devices, or the like may be placed between the wire drawing dies. It should be noted that each of the processes may be individually performed.

Figure 6:
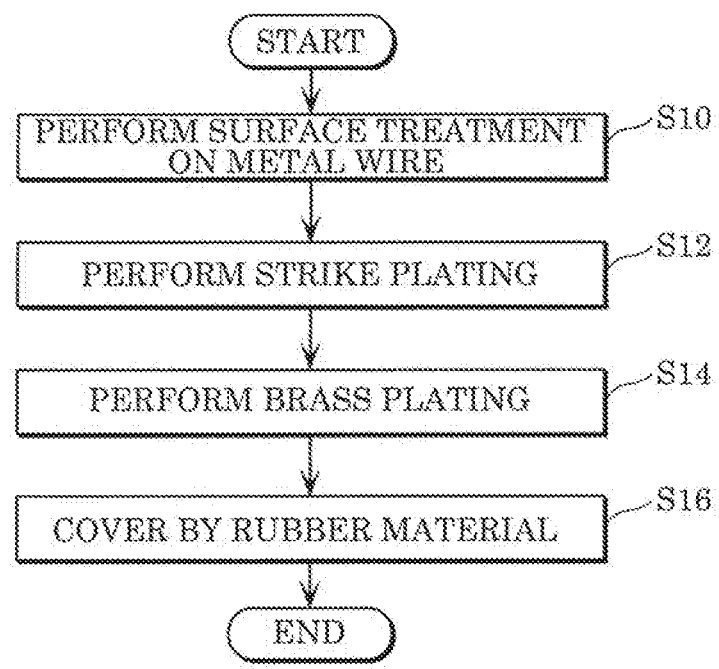
FIG. 6 is a flowchart illustrating a manufacturing method of the tungsten wire according to the embodiment.

Next, a method of manufacturing tungsten wire 100 which includes the above-described metal wire 110 will be described with reference to FIG. 6. FIG. 6 is a flowchart which illustrates a method manufacturing tungsten wire 100 according to the embodiment.

As illustrated in FIG. 6, first, surface treatment is performed on metal wire 110 (S10). More specifically, fine unevenness 112 or groove 113 is formed by performing electrolytic etching or mechanical processing on the surface of metal wire 110. In the case where unevenness is not formed on the surface of metal wire 110, the process of Step S10 is omitted.

Next, strike plating is performed on the surface of metal wire 110 which has been subjected to the surface treatment (S12). More specifically, strike plating layer 120 is formed on the surface of metal wire 110, by applying high electrical current to metal wire 110 in acid solution such as acidum hydrochloricum (HC) including nickel chloride ($NiCl_2$). In this manner, it is possible to remove an oxide film attached to the surface of metal wire 110, thereby enabling an increase in adhesion of plating in subsequent processes.

Subsequent to the strike plating, brass plating is performed (S14). More specifically, electricity is conducted between a brass plate and metal wire 110 in the state in which the brass plate and metal wire 110 is bathed into a plating solution. In this manner, plating layer 130 which is in contact with and covers strike plating layer 120.

Through the processes as described above, tungsten wire 100 whose surface is covered by the brass plating layer is manufactured. The length of tungsten wire 100 is, for example, at least 50 km immediately after manufacturing. Tungsten wire 100 is cut to a suitable length according to the aspect in which tungsten wire 100 is used.

It should be noted that manufacturing of tungsten wire 100 is performed as an in-line process, following the manufacturing of metal wire 110. More specifically, following the wire drawing dies used in the final drawing, a surface treatment device, a strike plating processing device, and a plating processing device are disposed in stated order in a production line. The manufacturing line is established such that, in particular, plating is promptly carried out after the strike plating.

After tungsten wire 100 is manufactured, tungsten wire 100 may be covered by rubber material 10 as illustrated in FIG. 6 (S16). More specifically, after tungsten wire 100 is cut to a predetermined length, tungsten wire 100 is placed in a metallic mold, and raw rubber material is poured into the metallic mold so as to cure tungsten wire 100. In this manner, an elastic component which includes tungsten wire 100 embedded in rubber material 10 is manufactured.

[Advantageous Effects, Etc.]

As described above, tungsten wire 100 according to the embodiment includes: metal wire 110 containing one of tungsten and a tungsten alloy; and plating layer 130 which covers a surface of metal wire 110. In tungsten wire 100, plating layer 130 contains copper. In addition, for example, in tungsten wire 100, plating layer 130 includes a surface covered by rubber material 10.

With this configuration, since tungsten has Young's modulus approximately twice as high as that of piano wire, metal wire 110 containing one of tungsten and the tungsten alloy is less subject to deformation than piano wire. Accordingly, when tungsten wire 100 is used for reinforcement of rubber material 10, it is possible to inhibit deformation of rubber material 10.

Meanwhile, tungsten has poor adhesion to rubber. Accordingly, when metal wire 110 containing one of tungsten and the tungsten alloy is simply embedded in rubber material 10, a gap is formed between rubber material 10 and metal wire 110, and thus metal wire 110 does not function as a reinforcement material for rubber material 10.

In contrast, according to the embodiment, plating layer 130 which contains copper and covers the surface of tungsten wire 100 is provided. Plating layer 130 is capable of increasing adhesion between metal wire 110 and rubber material 10. Accordingly, tungsten wire 100 sufficiently functions as a reinforcement material for rubber material 10, and thus it is possible to inhibit deformation of rubber material 10 when tungsten wire 100 is used for reinforcement of rubber material 10.

In addition, the elastic component according to the embodiment includes tungsten wire 100; and rubber material 10 which is in contact with and covers plating layer 130. Tire 1 is one example of the elastic component.

With this configuration, deformation of tire 1 is inhibited, and thus it is possible to increase handling stability and fuel efficiency. In addition, it is possible to reduce the number of steel cords 32 to be used, by replacing a certain number of steel cords 32 with tungsten cords 30. Accordingly, the number of reinforcement cords can be reduced as a whole, and thus it is also possible to reduce a weight of tire 1.

In addition, for example, tungsten wire 100 further includes strike plating layer 120 which is disposed between metal wire 110 and plating layer 130. Strike plating layer 120 is in contact with and covers the surface of metal wire 110. In addition, for example, strike plating layer 120 contains nickel.

With this configuration, it is possible to increase adhesion between metal wire 110 and plating layer 130. Accordingly, since peeling away of plating layer 130 is inhibited, it is possible to further increase adhesion between tungsten wire 100 (metal wire 110) and rubber material 10.

In addition, for example, a diameter of metal wire 110 is at least 50 μm and at most 200 μm.

With this configuration, metal wire 110 containing one of tungsten and the tungsten alloy has a tensile strength that increases with a decrease in a diameter. In other words, the tensile strength increases as metal wire 110 is rendered thinner, and it is possible to further inhibit deformation of rubber material 10. The amount of tungsten used is reduced as a result of metal wire 110 being rendered thinner, and thus it is also possible to reduce the weight of tire 1.

In addition, for example, a tensile strength of metal wire 110 is at least 4000 MPa.

With this, by using tungsten wire 100, it is possible to implement a tensile strength either equaling or surpassing a tensile strength of piano wire included in commonly used steel cord 32. Since steel cord 32 can be replaced with tungsten cord 30 that includes tungsten wire 100 having high Young's modulus, it is possible to inhibit deformation of tire 1.

In addition, for example, the surface roughness Ra of the surface of metal wire 110 may be at least 0.1 μm and at most 10 μm.

With this configuration, since the surface area of tungsten wire 100 increases, it is possible to further increase adhesion between rubber material and tungsten wire 100.

In addition, for example, metal wire 110 may contain a rhenium-tungsten alloy, and a rhenium content of metal wire 110 may be at least 0.1 wt % and at most 10 wt %.

With this configuration, it is possible to further increase the tensile strength of metal wire 110.

In addition, for example, metal wire 110 may contain the tungsten, the tungsten doped with potassium, and a potassium content of metal wire 110 is at least 0.001 wt % and at most 0.01.0 wt %.

With this configuration, it is possible to further increase the tensile strength of metal wire 110.

In addition, for example, rubber material 10 contains sulfur and carbon.

With this configuration, it is possible to increase the strength of rubber material 10. Accordingly, it is possible to further inhibit deformation of tire 1.

(Others)

Although the tungsten wire and elastic component according to the present disclosure has been described thus far, based on the above-described embodiment, the present disclosure is not limited to the above-described embodiment.

For example, strike plating layer 120 may be a nickel strike plating layer. For example, strike plating layer 120 may be a plating layer which contains copper. In addition, strike plating layer 120 need not necessarily be provided between metal wire 110 and plating layer 130.

In addition, for example, metal wire 110 may have surface roughness Ra less than 0.1 μm. The surface of metal wire 110 need not necessarily include unevenness.

In addition, for example, metal wire 110 may contain an alloy of tungsten and at least one metal different from tungsten. The metal different from tungsten is, for example, a transition metal, and specifically, iridium (Ir), ruthenium (Ru), osmium (Os), or the like. The content of the metal different from tungsten is, for example, at least 0.1 wt % and at most 10 wt % as with the rhenium content, but is not limited to this example. The rhenium content or the content of the metal different from tungsten may be less than 0.1 wt % or may be greater than 10 wt %. Furthermore, the potassium content may be less than 0.001 wt % or may be greater than 0.010 wt %.

In addition, for example, tire 1 may include only one of belts 20 and 22. In other words, the number of belts included in tire 1 is not limited to two. The number of belts may be one, or greater than or equal to three. In addition, tire 1 may be a bias tire instead of a radial tire.

In addition, for example, although tire 1 has been described as one example of the elastic component in the above-described embodiment, the elastic component is not limited to this example. For example, the elastic component may be a catheter or a conveyer belt. More specifically, tungsten wire 100 may be used as a reinforcement wire for a catheter or a conveyer belt.

In addition, for example, rubber material 10 need not necessarily include carbon. More specifically, rubber material 10 need not necessarily include carbon black that is used in a commonly used tire.

It should be noted that the present disclosure also includes other forms in which various modifications apparent to those skilled in the art are applied to the embodiment or forms in which structural components and functions in the embodiment are arbitrarily combined within the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A tungsten wire, comprising:
    a metal wire containing one of tungsten and a tungsten alloy;
    a plating layer which covers a surface of the metal wire; and
    a strike plating layer which is disposed between the metal wire and the plating layer, the strike plating layer being in contact with and covering the surface of the metal wire, wherein
    a tungsten content of the metal wire is at least 90 wt %,
    the plating layer contains copper,
    the strike plating layer contains nickel, and
    surface roughness Ra of the surface of the metal wire is at least 3 μm and at most 4 μm.

2. The tungsten wire according to claim 1, wherein a diameter of the metal wire is at least 50 μm and at most 200 μm.

3. The tungsten wire according to claim 1, wherein a tensile strength of the metal wire is at least 4000 MPa.

4. The tungsten wire according to claim 1, wherein the metal wire contains a rhenium-tungsten alloy, and a rhenium content of the metal wire is at least 0.1 wt % and at most 10 wt %.

5. The tungsten wire according to claim 1, wherein the metal wire contains the tungsten, the tungsten doped with potassium, and a potassium content of the metal wire is at least 0.001 wt % and at most 0.010 wt %.

6. The tungsten wire according to claim 1, wherein the plating layer includes a surface covered by a rubber material.

7. An elastic component, comprising:
    the tungsten wire according to claim 1; and
    a rubber material which is in contact with and covers the plating layer.

8. The elastic component according to claim 7, wherein the rubber material contains sulfur and carbon.

9. The tungsten wire according to claim 1, wherein the plating layer is a copper layer.

10. The tungsten wire according to claim 1, wherein the plating layer is a brass layer.

* * * * *